(12) United States Patent
Tu et al.

(10) Patent No.: US 12,416,812 B2
(45) Date of Patent: Sep. 16, 2025

(54) AUGMENTED REALITY GLASSES (71) Applicant: Acer Incorporated, New Taipei (TW)

(72) Inventors: Tsung-Wei Tu, New Taipei (TW);
Yi-Jung Chiu, New Taipei (TW);
Shih-Ting Huang, New Taipei (TW);
Yen-Hsien Li, New Taipei (TW);
Chun-Yu Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 747 days.

(21) Appl. No.: 17/711,065

(22) Filed: Apr. 1, 2022

(65) Prior Publication Data
US 2023/0194880 A1 Jun. 22, 2023

(30) Foreign Application Priority Data
Dec. 17, 2021 (TW) .................. 110147313

(51) Int. Cl.
*G02B 27/01* (2006.01)
*G02B 27/14* (2006.01)
*G02B 27/30* (2006.01)
*G02B 27/28* (2006.01)

(52) U.S. Cl.
CPC ..... *G02B 27/0176* (2013.01); *G02B 27/0172* (2013.01); *G02B 27/14* (2013.01); *G02B 27/30* (2013.01); *G02B 2027/0159* (2013.01); *G02B 2027/0178* (2013.01); *G02B 27/283* (2013.01)

(58) Field of Classification Search
CPC ........ G02B 27/0172; G02B 2027/0125; G02B 2027/0123; G02B 27/0176
See application file for complete search history.

(56) References Cited

U.S. PATENT DOCUMENTS

| | | | |
|---|---|---|---|
| 10,162,180 B2 * | 12/2018 | Cakmakci | ............... H04N 23/20 |
| 11,054,654 B1 | 7/2021 | Shih et al. | |
| 2014/0293434 A1 | 10/2014 | Cheng et al. | |
| 2014/0375542 A1* | 12/2014 | Robbins | ................ G06T 19/006 |
| | | | 345/156 |
| 2015/0234191 A1* | 8/2015 | Schowengerdt | ........ G06T 15/00 |
| | | | 345/633 |
| 2016/0178909 A1 | 6/2016 | Komatsu et al. | |
| 2016/0327789 A1 | 11/2016 | Klug et al. | |
| 2019/0204605 A1 | 7/2019 | Wu | |

FOREIGN PATENT DOCUMENTS

| | | |
|---|---|---|
| CN | 1813213 | 8/2006 |
| CN | 105934902 | 9/2016 |
| CN | 107193078 | 9/2017 |
| CN | 111656255 | 9/2020 |
| CN | 112346252 | 2/2021 |
| TW | I572898 | 3/2017 |
| TW | 201802536 | 1/2018 |

(Continued)

*Primary Examiner* — Ryan D Howard
(74) *Attorney, Agent, or Firm* — JCIPRNET (57) ABSTRACT

A pair of augmented reality glasses including a projection device and a waveguide is provided. The projection device is configured to provide a collimated beam. The waveguide has a plurality of free form surfaces. Distances between each free form surface and the projection device are different from each other. The collimated beam progresses to and reflects off these free form surfaces in sequence, and then enters eyes of the user.

15 Claims, 6 Drawing Sheets

(56) References Cited

FOREIGN PATENT DOCUMENTS

| TW | 201932914 | 8/2019 |
|----|-----------|--------|
| TW | 201937238 | 9/2019 |
| TW | 202011080 | 3/2020 |
| TW | 202016595 | 5/2020 |
| TW | 202134736 | 9/2021 |

* cited by examiner

AUGMENTED REALITY GLASSES

CROSS-REFERENCE TO RELATED APPLICATION

This application claims the priority benefit of Taiwan application serial no. 110147313, filed on Dec. 17, 2021. The entirety of the above-mentioned patent application is hereby incorporated by reference herein and made a part of this specification.

BACKGROUND

Technical Field

The disclosure relates to an optical apparatus, and more particularly relates to a pair of augmented reality glasses.

Description of Related Art

With the advancement of display technology, augmented reality display technology has gradually become popular, and has been widely used in people's lives, such as entertainment and medical surgery. Augmented reality technology allows a user to see not only a virtual image generated by an image light, but also an actual object. Moreover, the virtual image can interact with the actual object. However, different users have different interpupillary distances (IPDs). When a user wears augmented reality glasses, if a light beam cannot properly enter the user's pupils, it will cause the seen image to be twisted, distorted, blurred or even disappeared. In addition, augmented reality glasses further have the problem of vergence-accommodation conflict (VAC).

SUMMARY

The disclosure provides a pair of augmented reality glasses, capable of reducing or avoiding the problem of blurred images caused by different interpupillary distances and the problem of vergence-accommodation conflict.

According to an embodiment of the disclosure, a pair of augmented reality glasses is provided, including a projection device and a waveguide. The projection device is configured to provide a collimated beam. The waveguide has a plurality of free form surfaces. Distances between each free form surface and the projection device are different from each other. The collimated beam progresses to and reflects off these free form surfaces in sequence, and then enters eyes of a user.

According to another embodiment of the disclosure, a pair of augmented reality glasses is provided, including a projection device, a waveguide, and an adjustment mechanism. The projection device is configured to provide a collimated beam. The waveguide has a free form surface. The adjustment mechanism is configured to move the waveguide so that the free form surface can reflect the collimated beam into eyes of a user. The adjustment mechanism moves the waveguide on a direction parallel to an imaginary connection line connecting the user's two eyes.

Based on the above, the augmented reality glasses provided by the embodiments of the disclosure use at least one free form surface to achieve the function of adjusting an image beam so that the augmented reality glasses can be adapted to users with different IPDs, and the image beam can properly enter a user's two eyes to avoid the problem of blurred images. The augmented reality glasses further generate the collimated beam with the projection device, and use the characteristic of the small divergence angle of the collimated beam to reduce or avoid the VAC problem.

To make the aforementioned features and advantages of the disclosure more comprehensible, embodiments accompanied with drawings are described in detail as follows.

BRIEF DESCRIPTION OF THE DRAWINGS

FIG. 3A to FIG. 6 are schematic diagrams of augmented reality glasses according to embodiments of the disclosure.

DESCRIPTION OF THE EMBODIMENTS

Figure 1:
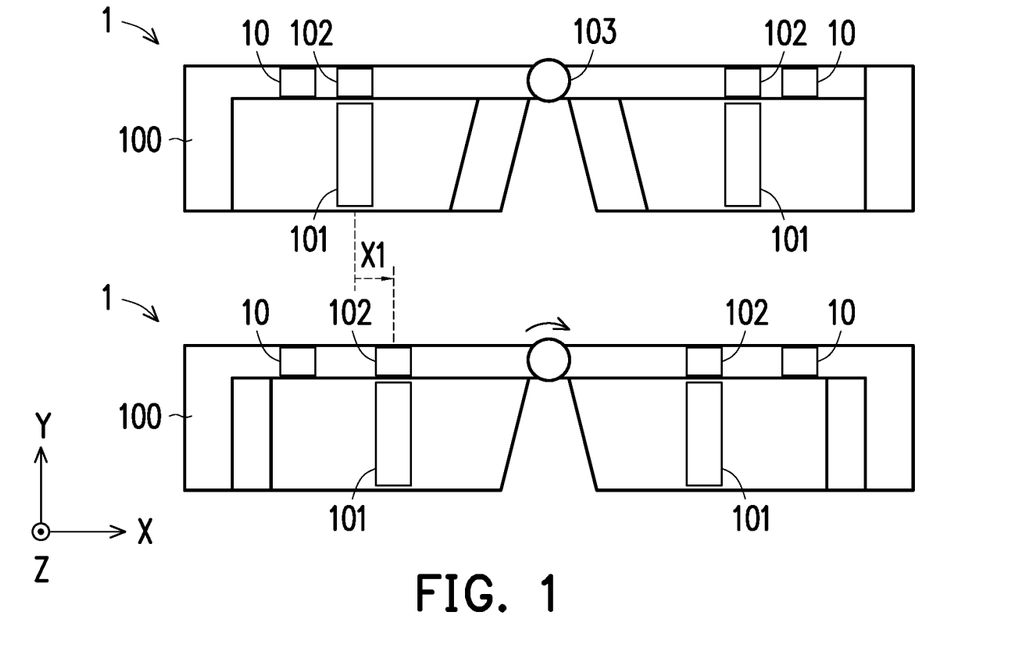
FIG. 1 is a schematic diagram of augmented reality glasses according to an embodiment of the disclosure.
Figure 2:
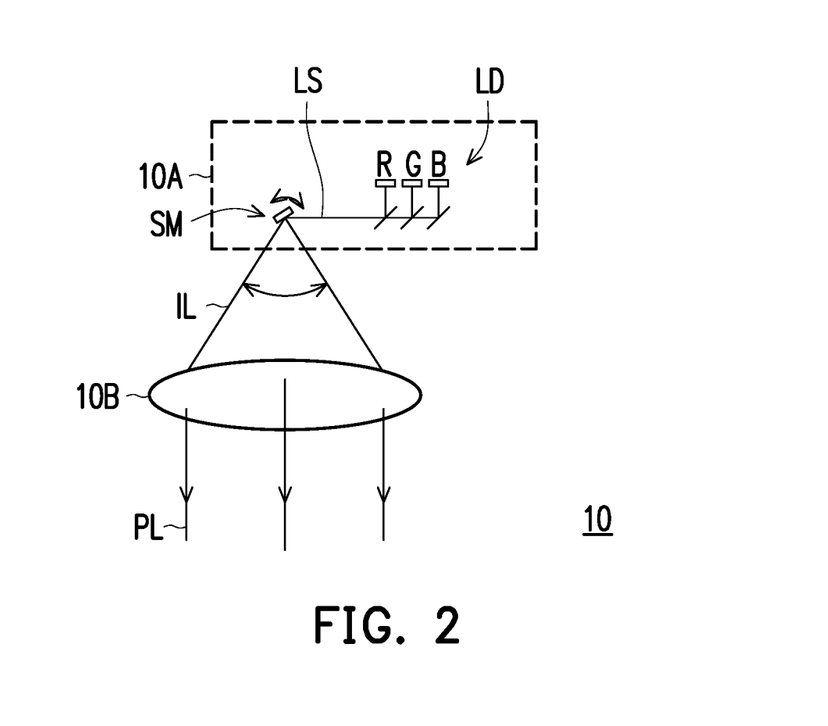
FIG. 2 is a schematic diagram of a projection device of FIG. 1.

FIG. 1 is a schematic diagram of augmented reality glasses according to an embodiment of the disclosure. FIG. 2 is a schematic diagram of a projection device of FIG. 1. Please refer to FIG. 1. The augmented reality glasses 1 include a projection device 10, a frame 100, a waveguide 101, a beam splitting device 102, and an adjustment mechanism 103. The projection device 10 may be arranged on the frame 100. The adjustment mechanism 103 is configured to move the waveguide 101 and the beam splitting device 102 on the X direction parallel to an imaginary connection line connecting a user's two eyes. As shown in FIG. 1, the adjustment mechanism 103 moves the waveguide 101 and the beam splitting device 102 by a distance X1.

Please refer to FIG. 2. The projection device 10 includes a laser scanning projector 10A and a collimator lens 10B. The laser scanning projector 10A includes a laser diode LD and a scanning mirror SM. The laser diode LD emits illumination light LS. The illumination light LS is reflected by the scanning mirror SM to generate image light IL. After passing through the collimator lens 10B, the image light IL becomes a collimated beam PL, and the collimated beam PL is output from the projection device 10.

Figure 3A:
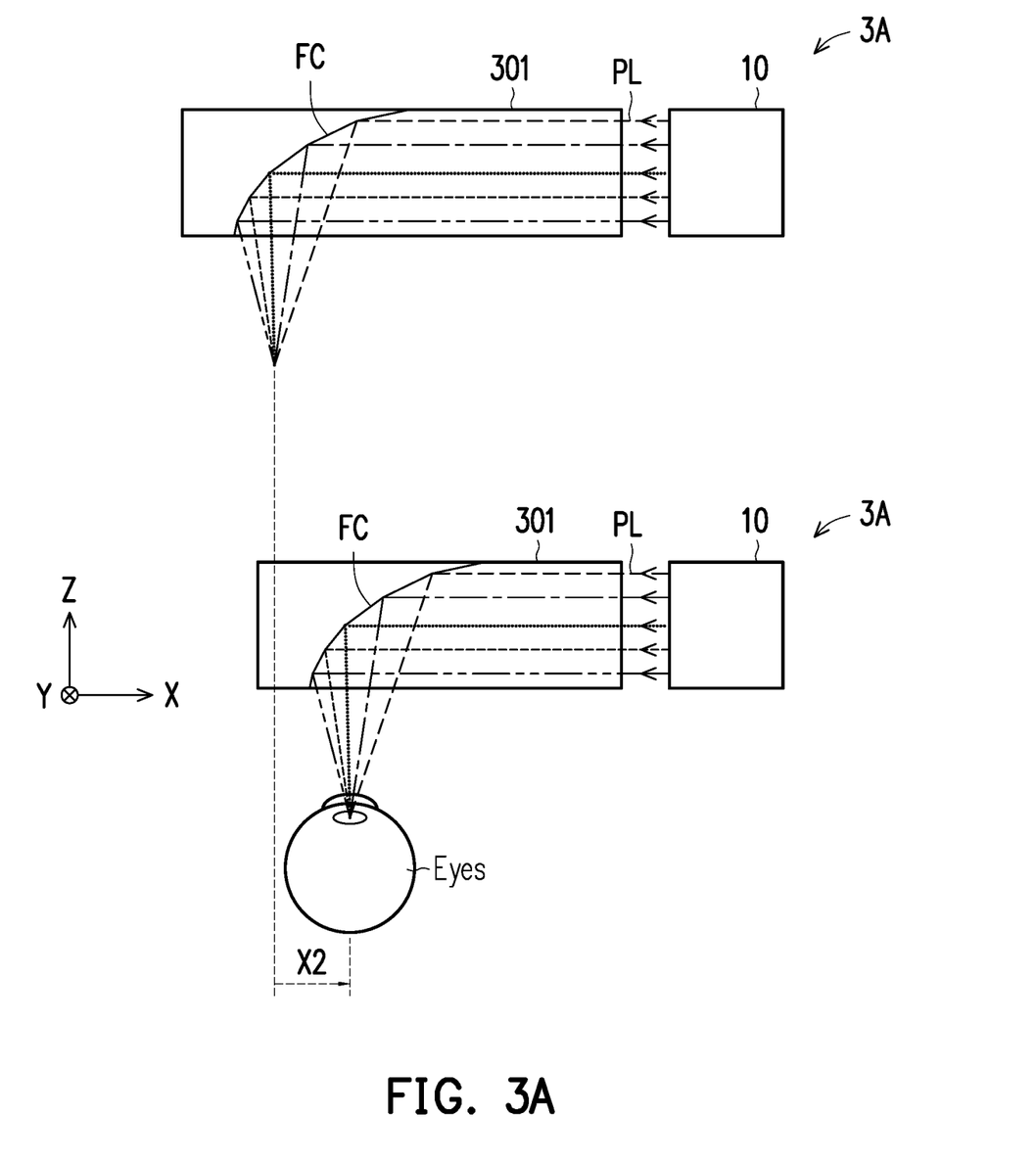

Please refer to FIG. 3A, which is a schematic diagram of augmented reality glasses according to an embodiment of the disclosure. The augmented reality glasses 3A include a projection device 10, a waveguide 301, and an adjustment mechanism (not shown). The projection device 10 provides a collimated beam PL as shown in FIG. 2. The waveguide 301 has a free form surface FC. The adjustment mechanism may be realized by the adjustment mechanism 103 in FIG. 1. In the embodiment, the adjustment mechanism moves the waveguide 301 by a distance X2 on the X direction parallel to the imaginary connection line connecting a user's two eyes so that the free form surface FC can reflect the collimated beam PL into eyes of the user.

To fully describe various implementation aspects of the disclosure, other embodiments of the disclosure are described in the following. It must be noted here that the following embodiments use the element numerals and part of the contents of the foregoing embodiments. The same numerals are used to denote the same or similar elements, and the description of the same technical content is omitted. For the description of the omitted parts, reference may be made to the foregoing embodiments, and thus the description is not repeated in the following embodiments.

Figure 3B:
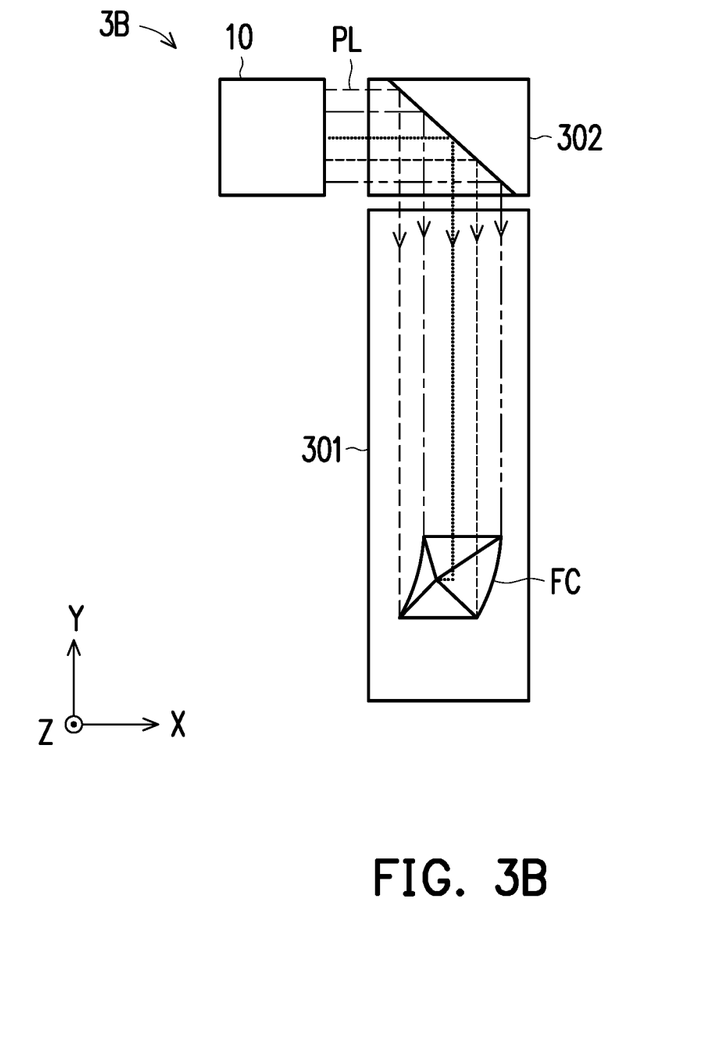

Please refer to FIG. 3B, which a schematic diagram of augmented reality glasses according to an embodiment of the disclosure. The augmented reality glasses 3B include a projection device 10, a waveguide 301, an adjustment mechanism (not shown), and a beam splitter 302. The beam splitter 302 is arranged on a path of a collimated beam PL. The embodiment is different from the embodiment shown in FIG. 3A in that the collimated beam PL progresses to a free form surface FC through the beam splitter 302. Specifically, the collimated beam PL enters the waveguide 301 after being partially reflected by the beam splitter 302. In addition, the adjustment mechanism moves the beam splitter 302 and the waveguide 301 on the X direction parallel to the imaginary connection line connecting a user's two eyes so that the free form surface FC can reflect the collimated beam PL into eyes of the user. Methods for moving the beam splitter 302 and the waveguide 301 are similar to methods for moving the beam splitting device 102 and the waveguide 101 in FIG. 1.

In an embodiment of the disclosure, the beam splitter 302 may be a polarizing beam splitter. The s-polarization state (polarization in the Z direction in FIG. 3B) in the collimated beam PL is reflected by the polarizing beam splitter 302, enters the waveguide 301, and reflects off the free form surface FC and enters eyes of the user.

Figure 4:
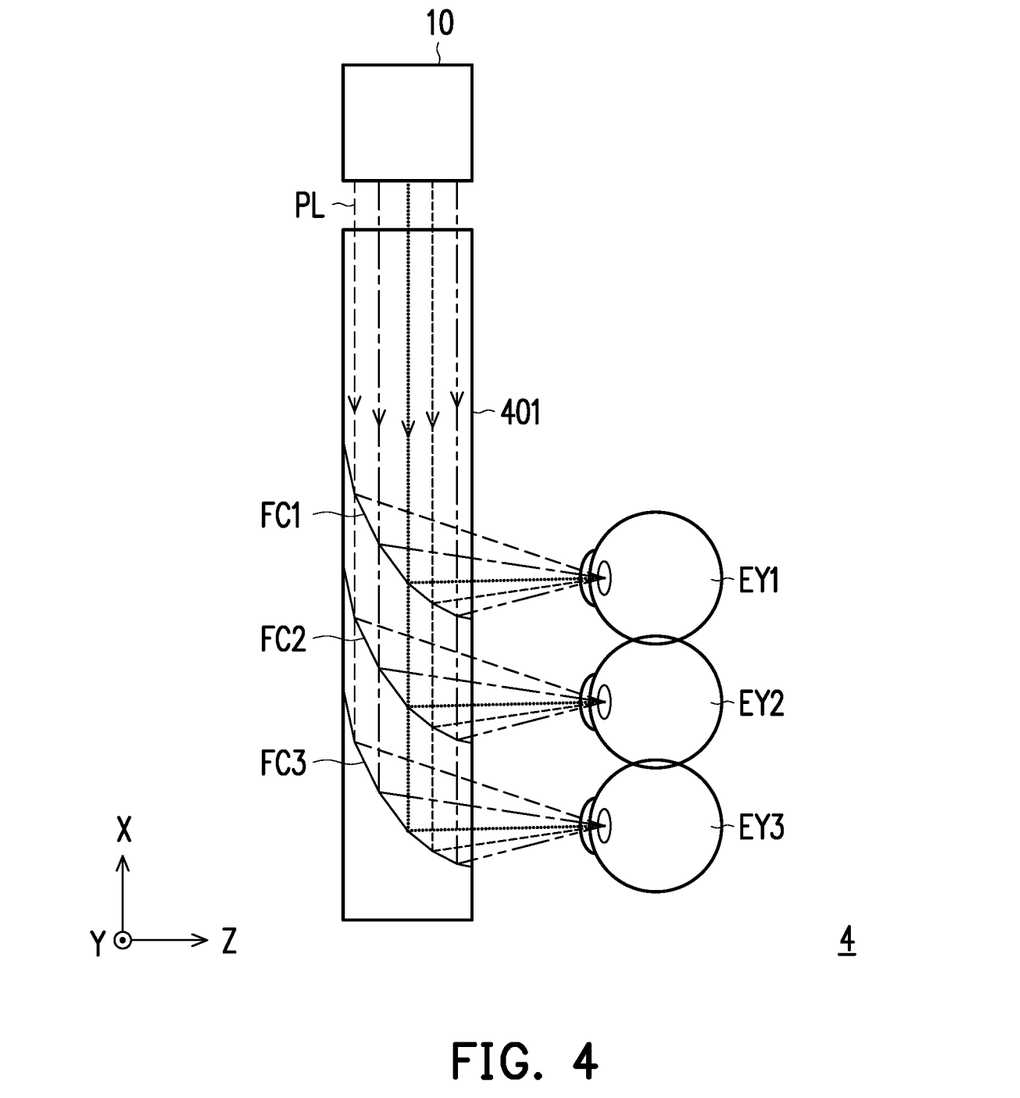

Please refer to FIG. 4, which is a schematic diagram of augmented reality glasses according to an embodiment of the disclosure. The augmented reality glasses 4 include a projection device 10 and a waveguide 401. The augmented reality glasses 4 are different from the augmented reality glasses 3A shown in FIG. 3A in that the waveguide 401 has free form surfaces FC1, FC2, and FC3 arranged in a linear manner along the X direction. The embodiment takes three free form surfaces as an example, but the number of free form surfaces is not limited thereto.

The free form surfaces FC1, FC2, and FC3 may be curved surfaces with the same surface shape, or may be curved surfaces with different surface shapes. Distances between the free form surfaces FC1, FC2, and FC3 and the projection device 10 are different from each other, and a collimated beam progresses to the free form surfaces FC1, FC2, and FC3 in sequence. Specifically, after entering the waveguide 401, the collimated beam PL output by the projection device 10 partially penetrates the free form surface FC1, and partially reflects off the free form surface FC1 to enter the eye EY1. The aforementioned collimated beam PL partially penetrating the free form surface FC1 progresses to the free form surface FC2, partially penetrates the free form surface FC2, and partially reflects off the free form surface FC2 to enter the eye EY2. The aforementioned collimated beam PL partially penetrating the free form surface FC2 progresses to the free form surface FC3, and reflects off the free form surface FC2 to enter the eye EY3. The above-mentioned eyes EY1, EY2, and EY3 respectively represent the positions of eyes of users when the users with different interpupillary distances wear the augmented reality glasses 4. In other words, the arrangement of a plurality of free form surfaces in the embodiment enables the augmented reality glasses 4 to be adapted to the users with different interpupillary distances.

Distances between the adjacent free form surfaces FC1 and FC2 and the adjacent free form surfaces FC2 and FC3 fall within a range of 3 mm to 5 mm so that the eyes in use do not receive collimated beams PL from the different free form surfaces at the same time.

In an embodiment of the disclosure, the augmented reality glasses 4 may further include an adjustment mechanism (not shown) for moving the waveguide 401 along the X direction so that one of the free form surfaces FC1, FC2, and FC3 can reflect the collimated beam PL into eyes of the user.

Figure 5:
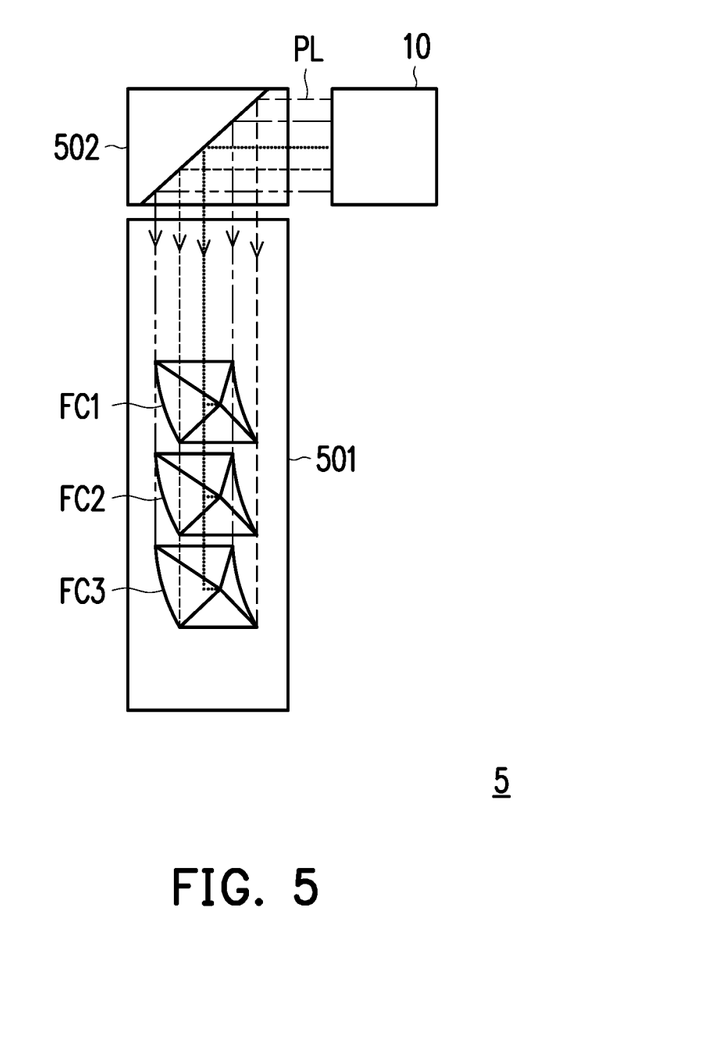

Please refer to FIG. 5, which is a schematic diagram of augmented reality glasses according to an embodiment of the disclosure. The augmented reality glasses 5 include a projection device 10, a beam splitter 502, and a waveguide 501. The augmented reality glasses 5 are different from the augmented reality glasses 3B shown in FIG. 3B in that the waveguide 501 has free form surfaces FC1, FC2, and FC3 arranged in a linear manner along the Y direction.

The same as the augmented reality glasses 3B shown in FIG. 3B, the augmented reality glasses 5 may further include an adjustment mechanism. The beam splitter 502 may be a polarizing beam splitter. The adjustment mechanism moves the beam splitter 502 and the waveguide 501 on the X direction parallel to the imaginary connection line connecting a user's two eyes so that one of the free form surfaces FC1, FC2, and FC3 can reflect a collimated beam PL into eyes of the user. Methods for moving the beam splitter 502 and the waveguide 501 are similar to methods for moving the beam splitting device 102 and the waveguide 101 in FIG. 1.

Figure 6:
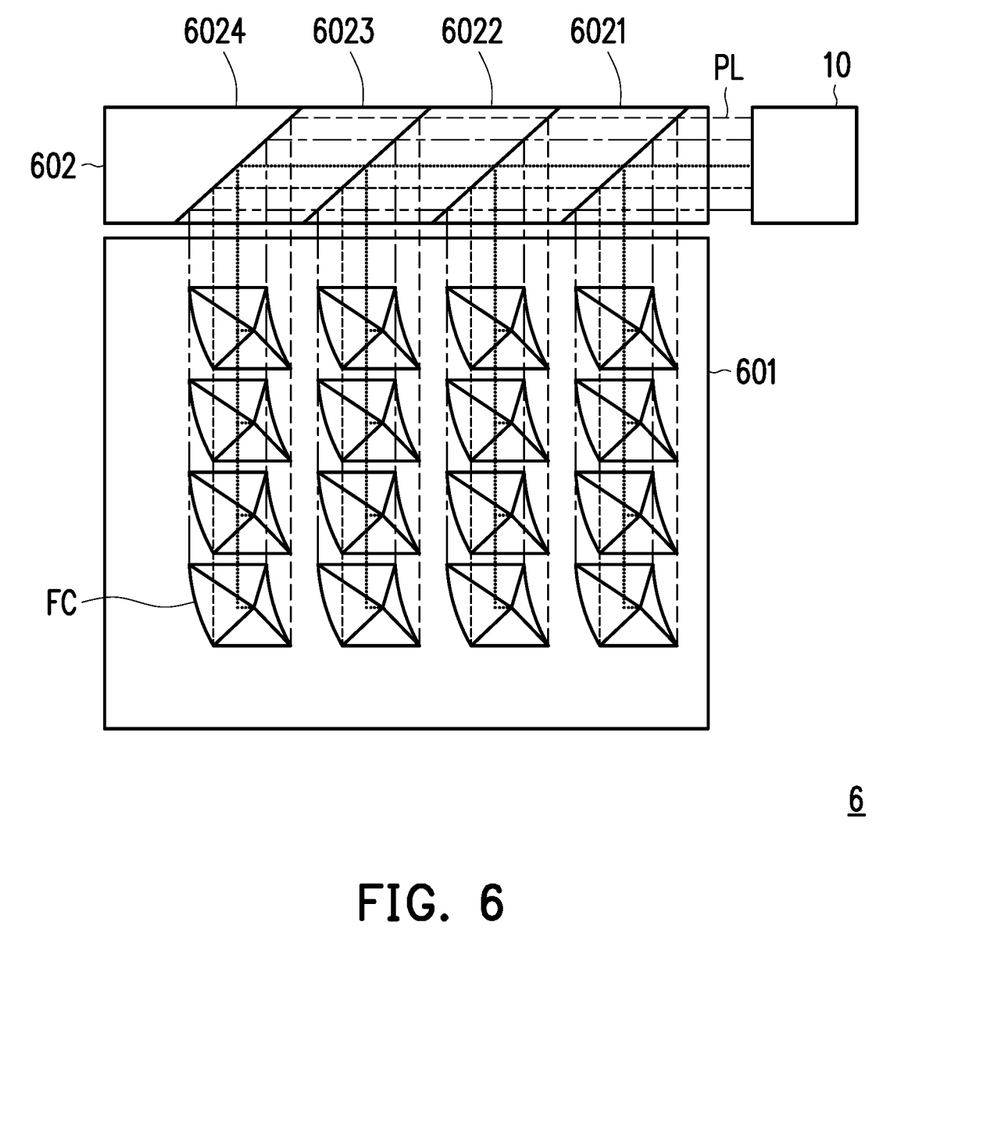

Please refer to FIG. 6, which is a schematic diagram of augmented reality glasses according to an embodiment of the disclosure. The augmented reality glasses 6 include a projection device 10, a beam splitting device 602, and a waveguide 601. The beam splitting device 602 has beam splitters 6021, 6022, 6023, and 6024, arranged in a linear manner along the X direction and arranged on a path of a collimated beam PL. After entering the beam splitting device 602, the collimated beam PL partially penetrates the beam splitter 6021, and is partially reflected by the beam splitter 6021 to enter the waveguide 601. The aforementioned collimated beam PL partially penetrating the beam splitter 6021 progresses to the beam splitter 6022, partially penetrates the beam splitter 6022, and is partially reflected by the beam splitter 6022 to enter the waveguide 601. The aforementioned collimated beam PL partially penetrating the beam splitter 6022 progresses to the beam splitter 6023, partially penetrates the beam splitter 6023, and is partially reflected by the beam splitter 6023 to enter the waveguide 601. The aforementioned collimated beam PL partially penetrating the beam splitter 6023 progresses to the beam splitter 6024 and is reflected by the beam splitter 6024 to enter the waveguide 601. In the embodiment, the beam splitting device 602 has four beam splitters, but the number of beam splitters is not limited thereto.

In the embodiment, each beam splitter corresponds to four free form surfaces. Taking the beam splitter 6021 as an example, the above-mentioned beam reflected by the beam splitter 6021 continues to progress to the four free form surfaces FC corresponding to the beam splitter, and the beam reflected by the beam splitter 6022 progresses to another four free form surfaces FC corresponding to the beam splitter. Similarly, the beams reflected by the beam splitter 6023 and the beam splitter 6024 progress to the four free form surfaces FC corresponding to the beam splitters, respectively. The same as the above-mentioned embodiment, the arrangement of a plurality of free form surfaces in the embodiment enables the augmented reality glasses 6 to be adapted to users with different interpupillary distances.

According to an embodiment of the disclosure, the augmented reality glasses 6 may further include an adjustment mechanism. The adjustment mechanism moves the beam splitting device 602 and the waveguide 601 on the X direction parallel to the imaginary connection line connecting a user's two eyes so that one of the plurality of free form surfaces can reflect a collimated beam PL into eyes of a user. Methods for moving the beam splitter 602 and the waveguide 601 are similar to methods for moving the beam splitting device 102 and the waveguide 101 in FIG. 1.

In summary, the augmented reality glasses provided by the embodiments of the disclosure use at least one free form surface to achieve the function of adjusting an image beam so that the augmented reality glasses can be adapted to users with different IPDs, and the image beam can properly enter eyes of a user to avoid the problem of blurred images. The augmented reality glasses further generate a collimated beam with a projection device, and use the characteristic of the small divergence angle of the collimated beam to reduce or avoid the VAC problem.

What is claimed is:

1. A pair of augmented reality glasses, comprising:
   a projection device configured to provide a collimated beam; and
   a waveguide having a plurality of free form surfaces, wherein distances between the plurality of free form surfaces and the projection device are different from each other, the collimated beam progresses to the plurality of free form surfaces in sequence, and the collimated beam reflects off one of the plurality of free form surfaces and enters eyes of a user,
   wherein distances between every two adjacent free form surfaces of the plurality of free form surfaces fall within a range of 3 mm to 5 mm.

2. The augmented reality glasses according to claim 1, further comprising at least one beam splitter arranged on a path of the collimated beam, and the collimated beam progressing to the plurality of free form surfaces through the at least one beam splitter.

3. The augmented reality glasses according to claim 1, wherein the projection device comprises a laser scanning projector and a collimator lens.

4. The augmented reality glasses according to claim 1, wherein the collimated beam partially penetrates and partially reflects off the plurality of free form surfaces.

5. The augmented reality glasses according to claim 1, further comprising an adjustment mechanism configured to move the waveguide so that one of the plurality of free form surfaces reflects the collimated beam into the eyes of the user.

6. The augmented reality glasses according to claim 5, further comprising at least one beam splitter arranged on a path of the collimated beam, and the adjustment mechanism being configured to move the at least one beam splitter, wherein the collimated beam progresses to the plurality of free form surfaces through the at least one beam splitter, and the adjustment mechanism moves the waveguide on a direction parallel to an imaginary connection line connecting the eyes of the user.

7. The augmented reality glasses according to claim 6, wherein the adjustment mechanism moves the at least one beam splitter on the direction parallel to the imaginary connection line connecting the eyes of the user.

8. The augmented reality glasses according to claim 7, wherein the plurality of free form surfaces are arranged in a linear manner along a direction perpendicular to the imaginary connection line connecting the eyes of the user.

9. The augmented reality glasses according to claim 1, wherein the plurality of free form surfaces are arranged in a linear manner along a direction parallel to an imaginary connection line connecting the eyes of the user.

10. The augmented reality glasses according to claim 9, further comprising an adjustment mechanism configured to move the waveguide along the direction parallel to the imaginary connection line connecting the eyes of the user.

11. The augmented reality glasses according to claim 5, further comprising a beam splitting device, the beam splitting device comprising a plurality of beam splitters.

12. The augmented reality glasses according to claim 11, wherein the plurality of beam splitters are arranged in a linear manner along a direction parallel to an imaginary connection line connecting the eyes of the user.

13. The augmented reality glasses according to claim 12, wherein each of the plurality of beam splitters corresponds to the plurality of free form surfaces arranged in a linear manner along a direction perpendicular to the imaginary connection line connecting the eyes of the user.

14. The augmented reality glasses according to claim 2, wherein the at least one beam splitter is a polarizing beam splitter.

15. The augmented reality glasses according to claim 1, wherein the plurality of free form surfaces are curved surfaces with different surface shapes.

* * * * *